UNITED STATES PATENT OFFICE.

FRED P. GORIN, OF SEATTLE, WASHINGTON, ASSIGNOR TO WILLIAM H. BENNINGHOFF, OF SEATTLE, WASHINGTON.

PROCESS FOR PRESERVING FOOD.

1,072,406.  Specification of Letters Patent.  Patented Sept. 2, 1913.

No Drawing.  Application filed January 6, 1913. Serial No. 740,310.

*To all whom it may concern:*

Be it known that I, FRED P. GORIN, a citizen of the United States, and a resident of Seattle, in the county of King and State of Washington, have invented certain new and useful Improvements in Processes for Preserving Food, of which the following is a full, true, and exact specification.

This invention relates to processes for preserving food and has for its principal object to provide a process of this character which is especially adapted to the preservation of cured meats, such for example, as smoked hams and bacon, etc., so that mold, mildew and the like will not collect thereon.

Important features of the invention are that the envelop formed by my improved process is amply resilient and tough to resist any ordinary handling incident to the shipping of the preserved food contained within the envelop, without breaking or even cracking the envelop, that the said envelop is perfectly transparent, so that the clean and fresh appearing product may be at all times seen therethrough. I accomplish these objects by the use of relatively cheap and simple ingredients combined and treated in a peculiar and novel manner, and afterward applied to the food to be preserved.

The invention will now be described in detail.

The materials used in my improved process are edible gelatin, glucose and water, preferably in the proportions of 25, 35 and 40 parts respectively. The gelatin and glucose are first placed within the inner kettle of an ordinary double boiler, the water within the outer kettle being somewhat more than lukewarm. Water, in the proportion mentioned, is then poured into the inner boiler and mixed with the other ingredients named, the temperature of the water in the outer boiler being meanwhile slowly raised until it reaches not less than 130 and not more than 150 degrees. It is important that the temperature be carefully watched from time to time so that the range mentioned be preserved. This cooking process must continue for about one and one-half hours for a bulk of 200 lbs. The food to be treated is now dipped into the mixture and immediately withdrawn, it being important that the same be not allowed to remain in the said mixture. The food is then hung so that any surplus mixture may drip away from it. A coating of the mixture is thus formed upon the food, which is perfectly transparent, very resilient and amply tough to successfully resist any handling to which such foods as hams, bacon, etc., are likely to be subjected. Experimental proof has shown that when the gelatin, glucose and water are simply mixed together and the bulk then heated in a double boiler, or otherwise, a coating material having many of the characteristics mentioned, will be obtained, but which is lacking in toughness and resiliency. In fact repeated experiments have shown that such improperly prepared coating has about the same resemblance to a coating prepared in accordance with my improved process as that which exists between a firm, new cloth and a piece of the same cloth which has become rotten. The immediate immersion into the mixture of the food to be preserved, at the time above indicated, and its immediate withdrawal from the mixture, is also a necessary step in the process.

While my experiments have been principally in connection with smoked meats of the character described, yet other food articles have been treated in the same manner with more or less success. Cheese, for example, has been successfully treated, and the same preserved perfectly free from mold, mildew or the like for a much greater length of time than it could otherwise be so preserved.

It will, of course, be understood that the proportions of gelatin and glucose may be varied considerably from that indicated and that a less substantial and tough product results from the use of a larger quantity of glucose in proportion to the gelatin, but I desire to be understood that food treated in the manner above described, and in fact when very little gelatin is used, will be successfully preserved for all ordinary commercial uses. The only necessity for using a larger percentage of gelatin is that the envelop is thereby rendered somewhat more tough. A mixture of gelatin and water, treated in the manner described, gives a partially satisfactory product, but, in addition to other serious objections, such a product is too expensive for the purposes intended. Glucose is a much cheaper ingredient than edible gelatin.

I am aware that the process which I have described may be varied possibly, without departing from the spirit and scope of the invention, and I do not therefore desire to be restricted to the exact steps given, except as limited in the appended claims.

Having described my invention, what I claim as new, and desire to protect by Letters Patent, is—

1. The process of preserving smoked meats by incasing the same, in airtight relation, within a transparent, yielding envelop formed by assembling gelatin, glucose and water in the proportion of 25, 35 and 40 parts respectively.

2. The process of preserving cured meats by assembling in the inner chamber of a double boiler, gelatin, 25 parts, and glucose 35 parts, filling the outer chamber of said boiler with clear water and slowly raising the temperature of the water in the said outer chamber to not less than 130 degrees and not more than 150 degrees for one and one-half hours to a bulk of 200 lbs., meanwhile pouring into the said inner chamber 40 parts of clear water and afterward immersing the meat into the mixture and immediately removing the same.

3. The process of preserving cured meats by assembling in the inner chamber of a double boiler, gelatin and glucose, filling the outer chamber of the said boiler with clear water and slowly raising the temperature of the water in the said outer chamber to not less than 130 degrees and not more than 150 degrees, for 1½ hours, to a bulk of 200 pounds, meanwhile pouring into the said inner chamber clear water and afterward immersing the meat into the mixture and immediately removing the same.

4. The process of preserving foods by assembling in the inner chamber of a double boiler, gelatin and glucose, filling the outer chamber of the said boiler with clear water and slowly raising the temperature of the water in the said outer chamber to not less than 130 degrees and not more than 150 degrees for 1½ hours, to a bulk of 200 pounds, meanwhile pouring into the said inner chamber clear water and afterward immersing the food into the mixture and immediately removing the same.

FRED P. GORIN.

Witnesses:
Roy Ford,
R. D. Smalley.